United States Patent [19]

Metzger

[11] 4,144,495
[45] Mar. 13, 1979

[54] SATELLITE SWITCHING SYSTEM

[75] Inventor: Sidney Metzger, Kensington, Md.

[73] Assignee: Communications Satellite Corporation, Washington, D.C.

[21] Appl. No.: 773,862

[22] Filed: Feb. 23, 1977

[51] Int. Cl.² .............................................. H04B 7/00
[52] U.S. Cl. ................................... 325/4; 343/100 ST
[58] Field of Search ................. 343/100 ST; 325/3, 4, 325/14

[56] References Cited

U.S. PATENT DOCUMENTS

| 3,340,531 | 9/1967 | Kefalas et al. | 343/100 ST |
| 3,711,855 | 1/1973 | Schmidt et al. | 343/100 ST |
| 3,810,255 | 5/1974 | Wachs et al. | 343/100 ST |
| 3,928,804 | 12/1975 | Schmidt et al. | 343/100 ST |

Primary Examiner—Maynard R. Wilbur
Assistant Examiner—T. M. Blum
Attorney, Agent, or Firm—Sughrue, Rothwell, Mion, Zinn and Macpeak

[57] ABSTRACT

A multi-beam satellite switching system employs on-board switching for the purpose of increasing the up path and down path antenna gains. A multiplicity of up path antenna beams and of down path antenna beams (not necessarily the same number of each direction) are provided by the system. A number of amplifier systems are distributed across the frequency band of interest. These amplifier systems comprise input amplifiers including filters, frequency converters and output amplifiers. A switching and control circuit accepts an up path signal from only the desired input amplifier and connects the desired output amplifier to the desired down path beam. Each earth station transmits to the satellite a suitable signal to perform the desired switching functions.

14 Claims, 19 Drawing Figures

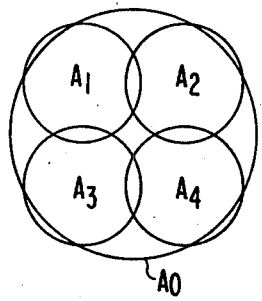
FIG 1
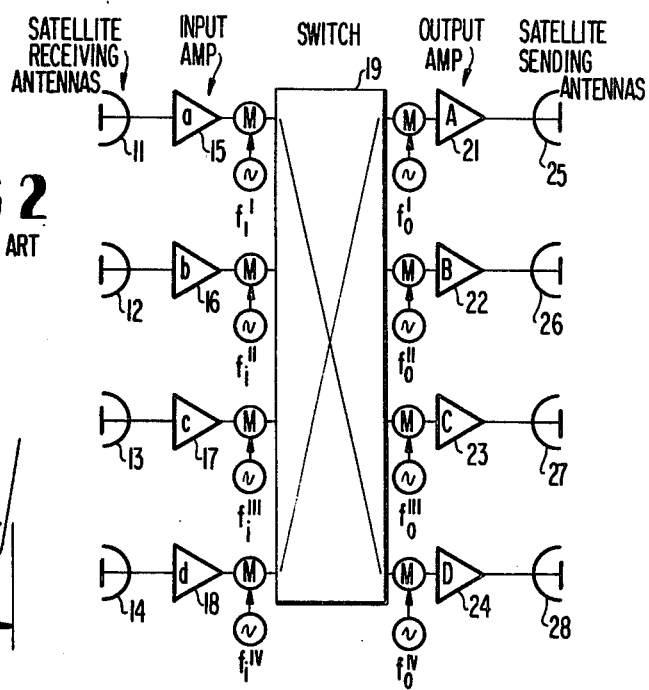
FIG 2
PRIOR ART
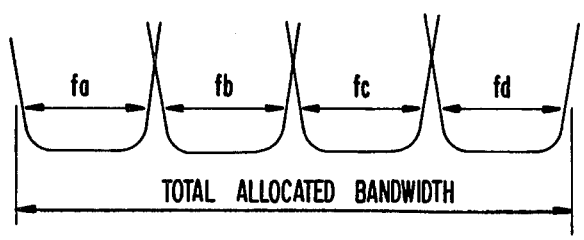
FIG 4
FIG 5
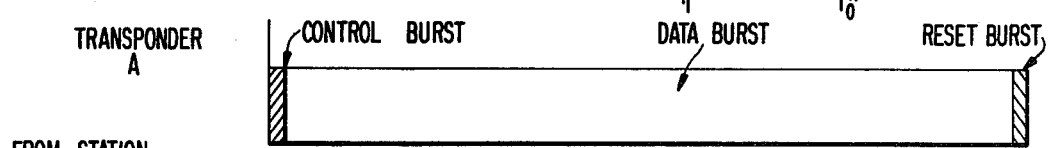
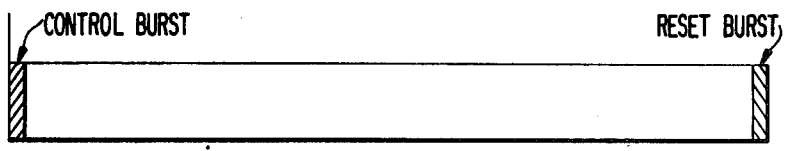
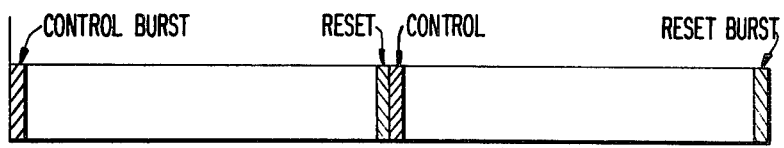
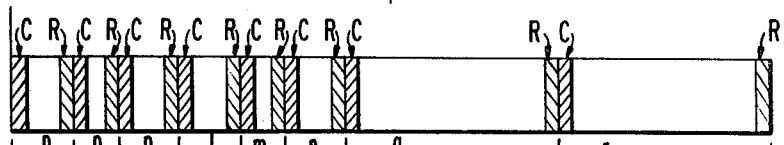

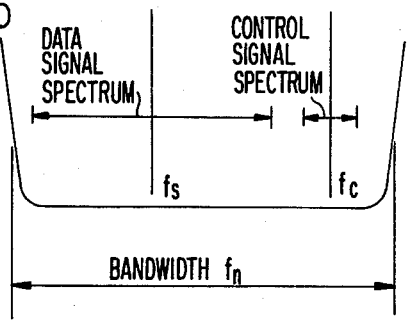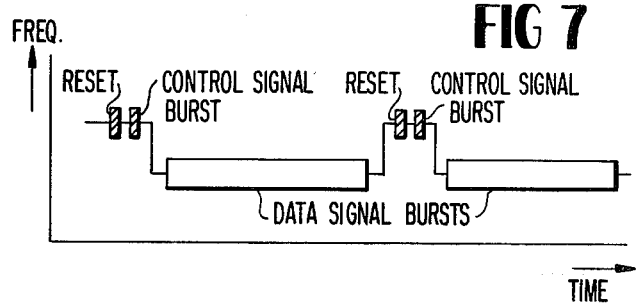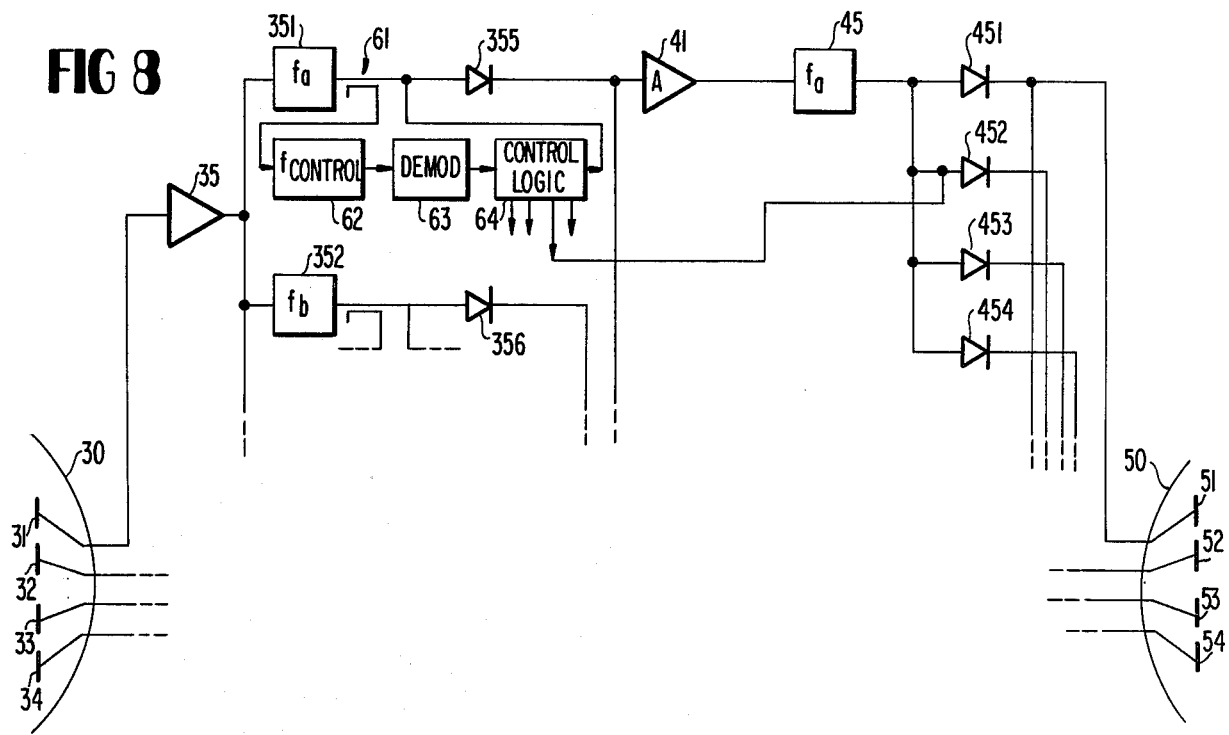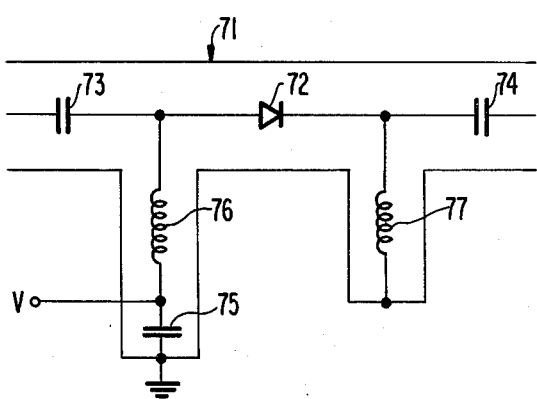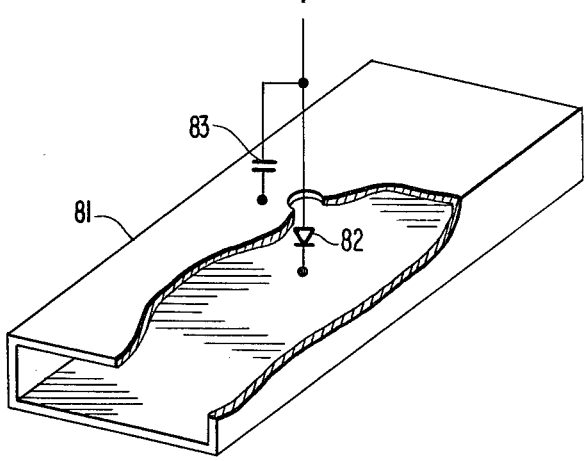

SATELLITE SWITCHING SYSTEM

BACKGROUND OF THE INVENTION

The present invention generally relates to satellite communication systems, and more particularly to a multi-beam satellite system employing onboard switching for the purpose of increasing the up path and the down path antenna gains.

It is sometimes desirable to increase the effective radiated power from a satellite in a given direction toward the ground in order to increase the channel capacity in that direction, and/or to permit the use of a smaller earth station antenna, and/or a less costly earth station receiver (one with a higher noise level). The need for such an approach can be appreciated when one considers present designs wherein a number of satellite-born transponders, each on a different frequency, connect to a single antenna illuminating a given area $A_0$ as illustrated in FIG. 1 of the drawings. This system is very flexible in that all signals from all transponders can be received anywhere in the area $A_0$. Thus, the outputs of all transponders, or some of these down to a single one can be addressed to a given station on the ground, and this number of transponders can be varied with time. The disadvantage of this system lies in that the power of all transponders is constantly illuminating the entire area $A_0$ even though the signals from one or more transponders may be addressed to only a single station in the entire area. In the limiting case, it would be desirable for each satellite transponder to illuminate only the station addressed.

Similarly, the use of higher gain receive antennas on the satellite permits the use of greater channel capacity from a given earth station, and/or a smaller earth station antenna, and/or a lower powered transmitting amplifier in the earth station.

The present approach to improving on this situation is to narrow the satellite antenna beams both in the earth-to-satellite and also the satellite-to-earth directions as shown in FIG. 2. In this arrangement, four separate up beams and four separate down beams are shown, although a greater or smaller number may be used. Each set of satellite receiving antennas 11, 12, 13 and 14 are directed at the corresponding areas $A_1$, $A_2$, $A_3$ and $A_4$ within the larger area $A_0$ as shown in FIG. 1. The receiving antennas 11, 12, 13 and 14 are permanently connected to the input amplifiers 15, 16, 17 and 18, respectively. The switch 19 connects each input amplifier to a different output amplifier 21, 22, 23 and 24 on a sequential basis. Typically, a mixer and a suitable oscillator are provided for each chain so as to produce a common IF for switching. An output mixer and oscillator per chain may also be added as shown in the figure. This is a classic arrangement used in Intelsat I where down conversion was made from 6GHz to 60MHz followed by up conversion to 4GHz. Each output amplifier 21, 22, 23 and 24 connects to only one transmitting antenna 25, 26, 27 and 28, respectively, and each of these transmitting antennas is directed to a different area on the ground corresponding to the areas $A_1$, $A_2$, $A_3$ and $A_4$ shown in FIG. 1. The arrangement shown in FIG. 2 assumes a time division multiplex system with the various stations properly synchronized with each other, and such arrangements have been described previously. A shortcoming of such systems is their relative inflexibility in that only one output amplifier is associated with each beam. It is possible to make one given amplifier of higher power than another or to connect more than one amplifier to a given beam, since each amplifier is assumed to cover a different frequency band from the others, as a means of increasing the channel capacity in a given direction; however, this presupposes a known traffic pattern.

SUMMARY OF THE INVENTION

The present invention achieves the same purpose of increasing satellite radiated power by using narrow antenna beams but in a flexible fashion, permitting the number of transponders assigned to a given antenna beam to be varied in a dynamic, real time manner. The basic concept is to provide a multiplicity of up path antenna beams and of down path antenna beams (not necessarily in the same number for each direction); a number of amplifier systems distributed across the frequency band of interest, these amplifier systems comprising input amplifiers including filters, frequency converters and output amplifiers; means for accepting an up path signal from only the desired input amplifier in order to reduce the noise from other input amplifiers, the means for connecting the desired output amplifier to the desired down path beam. Means are provided for each earth station transmitting to the satellite to send suitable control signals to perform the desired switching functions. These signals may be sent by suitably modifying the amplitude of the earth station's normal carrier power or by sending a coded signal using the same frequency-type of modulation as for the normal signal but separated in time; or by sending a separate carrier frequency utilizing a much narrower bandwidth than for the communication signals.

BRIEF DESCRIPTION OF THE DRAWINGS

The invention will be better understood from the following detailed description with reference to the acompanying drawings, in which:

FIG. 1 is a graphical illustration of the area of illumination of a wide antenna beam with the superposed areas of illumination of a multiplicity of narrow antenna beams;

FIG. 2 is a block diagram of a prior art satellite switching system;

FIG. 4 is a graphical illustration showing the division of the total allocated bandwidth into four frequency bands corresponding to each of the four output amplifiers of the system shown in FIG. 3;

FIG. 5 is a timing diagram illustrating some of the possible arrangements for various stations and various beams in the operation of the system as illustrated in FIG. 3;

FIG. 6 is a graphical illustration of the bandwidth of one of the filters in the system shown in FIG. 3 showing the frequency arrangement of data signals and of control signals;

FIG. 7 is a time and frequency diagram showing the relative time and frequency arrangement of data and control signal bursts;

FIG. 8 is a block diagram providing a general illustration of the switch control logic for the system shown in FIG. 3;

FIGS. 9A and 9B are, respectively, a schematic diagram of a coax diode switch circuit and a pictorial view of a waveguide diode switch circuit;

DETAILED DESCRIPTION OF THE INVENTION

Figure 3:
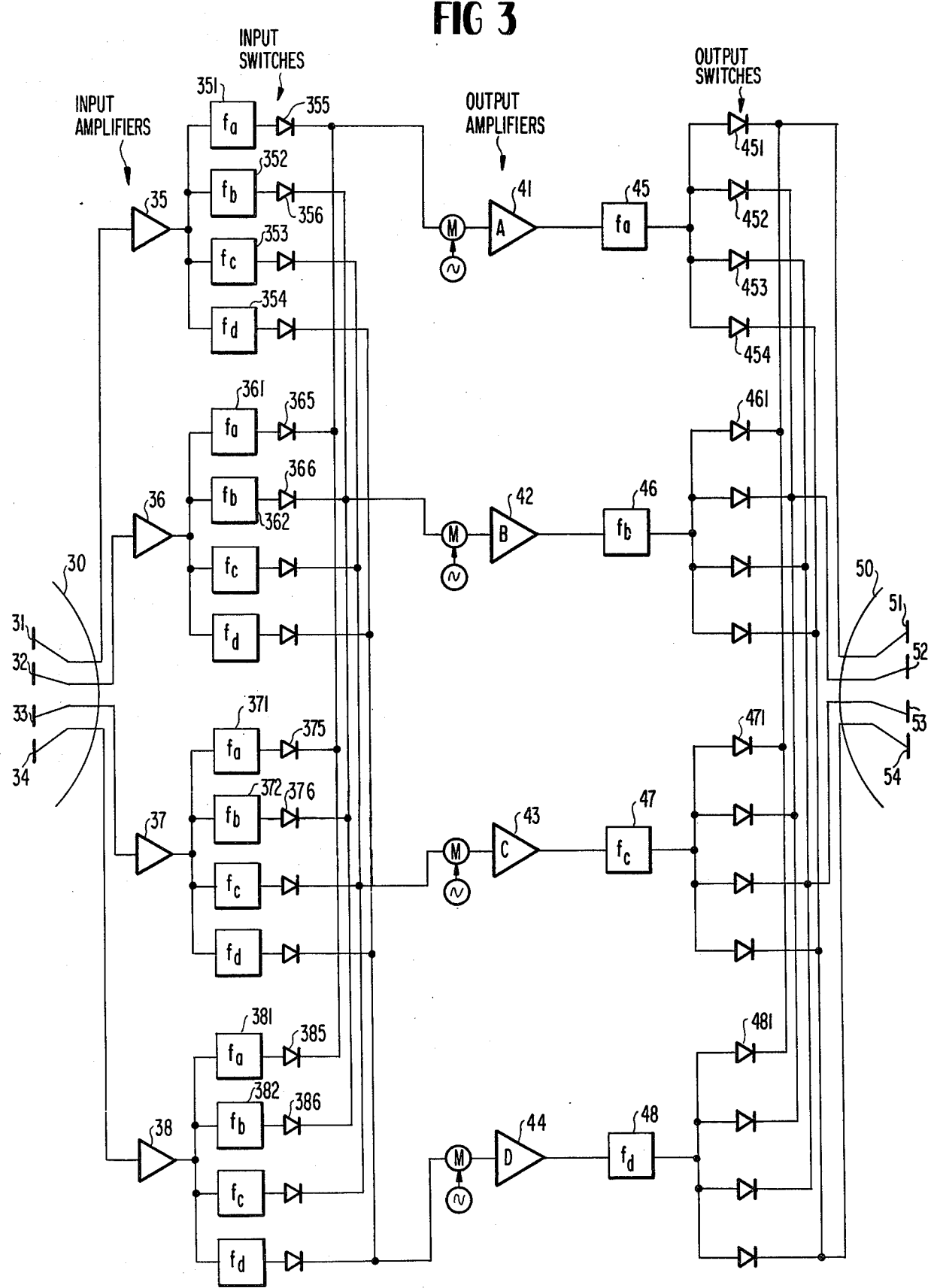
FIG. 3 is a block diagram of a satellite switching system illustrating the basic concepts of the present invention.

In the system illustrated in FIG. 3, a single receiving antenna is illustrated comprising a reflector 30 and multiple feeds 31, 32, 33 and 34. Each feed is offset from the other so that each resulting antenna beam covers a different area on the ground $A_1$, $A_2$, $A_3$ and $A_4$ as shown in FIG. 1. It will, of course, be recognized by those skilled in the art that this arrangement is the full equivalent of using a separate reflector and feed combination for each beam as illustrated in FIG. 2. Each antenna feed 31, 32, 33 and 34 is coupled to a respective input amplifier 35, 36, 37 and 38, and each of these input amplifiers covers the entire bandwidth. Following each input amplifier is a set of four filters which divide the total allocated bandwith into four frequency bands $f_a$, $f_b$, $f_c$ and $f_d$, each approximately one-quarter of the total bandwidth, as shown in FIG. 4. For example, the output of input amplifier 35 is connected to the four filters 351, 352, 353, and 354 having respective passbands $f_a$, $f_b$, $f_c$ and $f_d$. Corresponding filters in each set of four filters feed a common output amplifier through diode input switches. For example, the outputs of filters 351, 361, 371 and 381 are coupled via respective diode input switches 355, 365, 375 and 385 to the input of output amplifier 41. Similarly, the outputs of filters 352, 362, 372 and 382 are coupled through respective input switches 356, 366, 376 and 386 to output amplifier 42. Similar connections are made for the output amplifiers 43 and 44. As shown in FIG. 3, the connection between the input switches and the output amplifiers may not be direct but through a mixer and a suitable oscillator to provide a down conversion from 6GHz to 4GHz. It will be observed that no up conversion is required in this arrangement which is typical of Intelsat II, III, IV and IVa systems. In the Intelsat V system, there is both down conversion from 14GHz to 4GHz followed by up conversion from 4GHz to 11GHz. It will be appreciated, however, that the invention is not limited to any specific arrangement employing up and/or down conversion, and no further mention of frequency conversion will be made in describing the several embodiments.

As will be more apparent from the description which follows, the input switches are used to prevent noise from other than the desired input amplifier from reaching the desired output amplifier. In other words, if these input switches were not used, the input to amplifier 41, for example, would include noise contributions from all four of the input amplifiers 35, 36, 37 and 38 in the frequency band $f_a$. By selecting only one of the input amplifiers 35, for example, by energizing the input diode switch 355 to feed output amplifier 41, the noise power delivered to the input amplifier 41 is reduced to one-quarter of what it would be if the outputs of all four filters 351, 361, 371 and 381 were connected to the input of amplifier 41.

Figure 14:
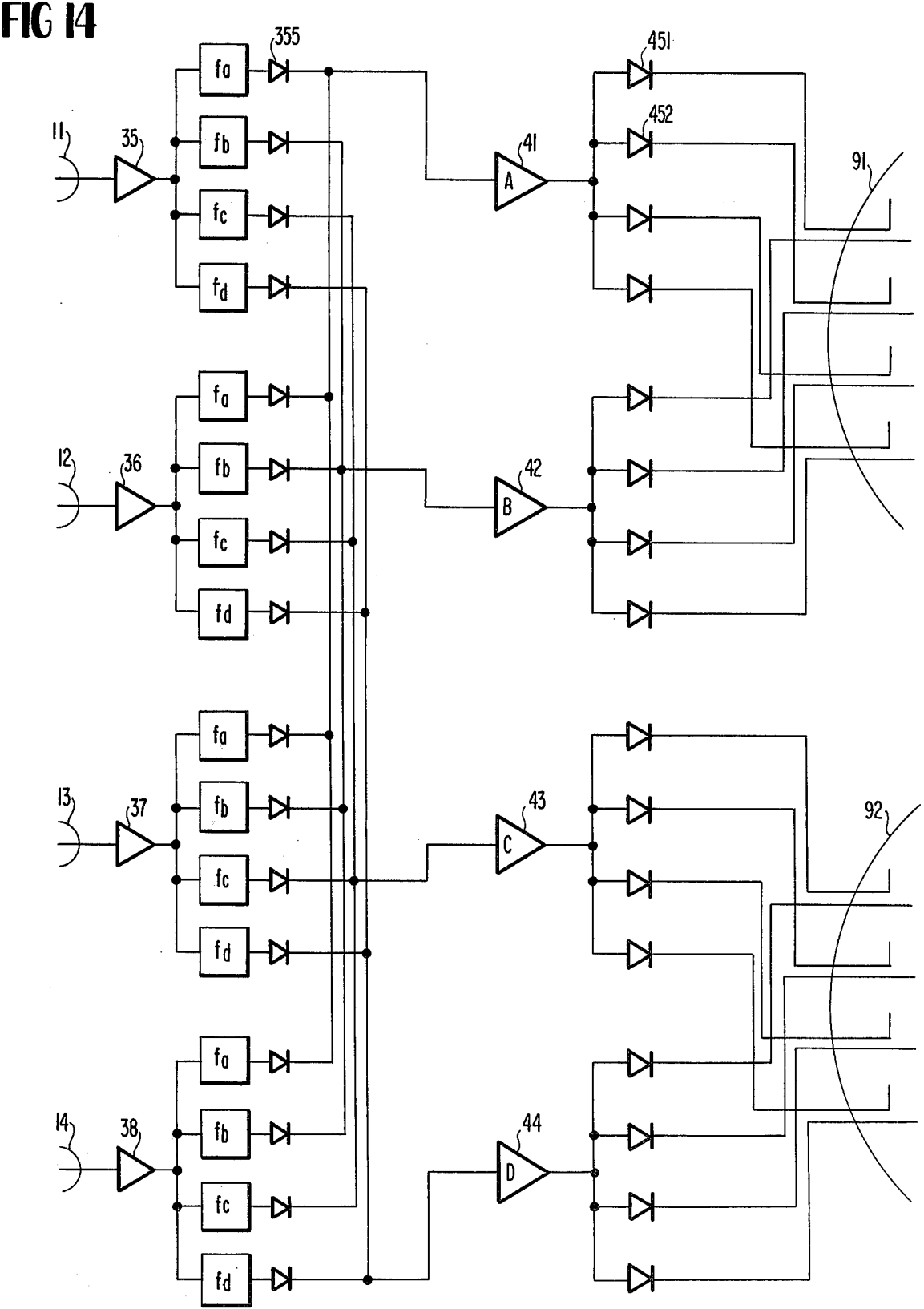
FIG. 14 is a block diagram of an alternative satellite switching system according to the invention which minimizes the complexity of the output network at the expense of additional antennas and feeds.
Figure 15:
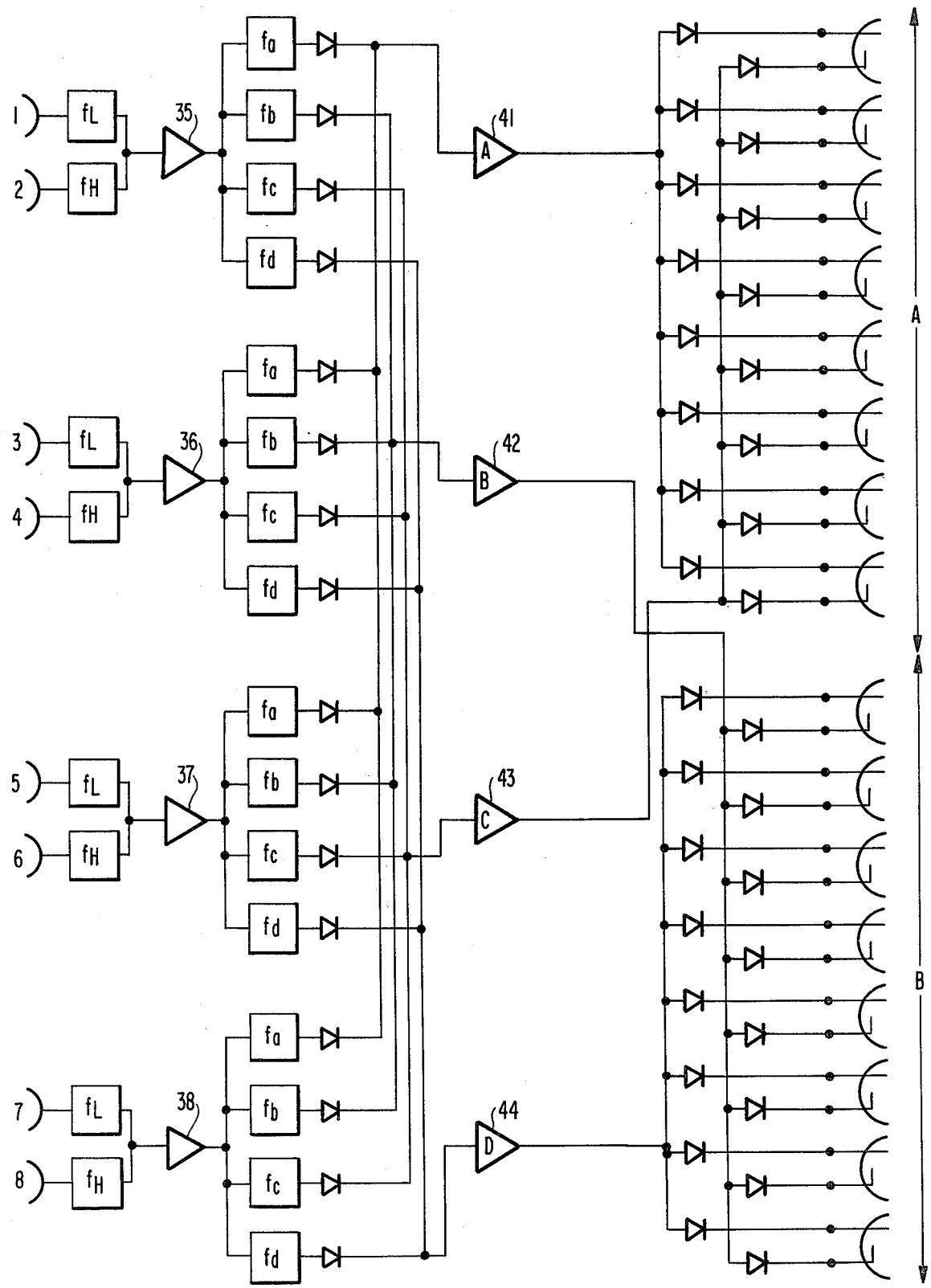
FIG. 15 is a block diagram of yet another alternative satellite switching system according to the invention showing means of using a lesser number of input amplifiers than up path beams but with a loss of available bandwidth per beam.

Each output amplifier 41, 42, 43 and 44 is followed by a single filter 45, 46, 47 and 48, respectively. Each of these filters has approximately the same bandwidth as the corresponding filters of each input set of filters. That is, the bandwidths of filters 45, 46, 47 and 48 are respectively $f_a$, $f_b$, $f_c$ and $f_d$. These filters permit the various output amplifiers to connect to the same transmitting antenna port without interaction. The transmitting antenna comprises a single reflector 50 and multiple feeds 51, 52, 53, and 54. As with the receiving antenna, each feed is offset from the others so that each resulting anteanna beam covers a different area on the ground $A_1$, $A_2$, $A_3$ and $A_4$ as illustrated in FIG. 1. Again, it will be recognized by those skilled in the art that a separate reflector and feed combination can be used for each beam. By using separate antennas, it is possible to eliminate the output filters 45, 46, 47 and 48 as shown in FIGS. 14 and 15. It is, of course, also possible to use the same antenna and feeds for both transmission and reception as is common in satellites and also in satellite earth station antennas. Each antenna feed 51, 52, 53 and 54 is connected to all of the output filters 45, 46, 47 and 48 via output diode switches. For example, output filter 45 is connected to each of the output antenna feeds 51, 52, 53 and 54 via output diode switches 451, 452, 453 and 454, respectively. Moreover, antenna feed 51 is connected to each of the output filters 45, 46, 47 and 48 via the output diode switches 451, 461, 471 and 481, respectively.

In operation, a switch control signal transmitted prior to the data signal controls which of the input diode switches and which of the output diode switches are energized. For example, let it be assumed that a station in area $A_1$ transmits on a frequency $f_a$ to a station in area $A_2$. The control signal transmitted prior to the data signal will cause the diode input switch 355 to be energized and the diode output switch 452 to be energized. Thus, a signal received by input antenna feed 31 is amplified by input amplifier 35 and connected via filter 351 and diode input switch 355 to the input of output amplifier 41. The output of amplifier 41 is connected via the output filter 45 and the output diode switch 452 to the output antenna feed 52. The manner in which this is accomplished as well as the specific nature of each of the diode switches will be described in more detail hereinafter. For the moment, however, it is important to appreciate the flexibility afforded by the system shown in FIG. 3. This flexibility is a direct result of the ability to energize any combination of input and output switches. From the timing diagram shown in FIG. 5, it will be appreciated that no synchronization is required between users of different frequency bands $f_a$, $f_b$, $f_c$ and $f_d$ since these signals are separate satellite output amplifiers. For earth stations transmitting on the same frequency, it is, of course, necessary that these be synchronized so that the bursts from these various stations properly interleave in time. Such a system is referred to as a time division multiple access (TDMA) system, and means for achieving such synchronization are well known in the art. FIG. 5 shows the flexibility of the system wherein one station may use an entire transponder A full time to transmit to another station, the latter then uses a second transponder B for its return signals, as shown for stations g and j. In FIG. 3, the output amplifiers 41, 42, 43 and 44 together with the respective circuitries inclusive of the receiving antenna feed to the transmitting antenna are considered to be transponders A, B, C and D, respectively. Referring back to FIG. 5, it will be understood that the rectangle marked "data burst" represents samples of a great many voice, telegraph or the like channels sent from the station g to the station j in that one frame. Each data burst is preceded by a control signal burst containing the information for the satellite as to which input and output diode switches are to be energized. A different arrangement is shown for transponder C in which two stations u and v are sharing a single transponder for the two directions of transmission. Of course, this arrangement has only half the voice channel capacity of the previous arrangement since one transponder is used instead of two. In the final example shown in FIG. 5, the transponder D shows six stations interchanging information within a single transponder. The important point here is that the various stations in one beam can communicate with other stations of that beam or any other beam in a flexible fashion permitting at one extreme, all transponders to connect to the same antenna port and thus illuminate the same area. The up path signals for the four transponders may also be sent all from one area. At the other extreme, the up path signals and down path signals may be uniformly distributed so that on the average one amplifier's time and power is allocated to each one of the four areas for the example illustrated in FIG. 1.

Now that the manner of operation of the system is understood, the way in which this operation is accomplished will now be described. The control signals which specify which of the input and output diode switches are energized must be distinguishable from the data signals in some unambiguous fashion. The difference may be one of time, frequency, amplitude, or a combination of these. FIGS. 6 and 7 show one arrangement wherein the control signals are separated in both time and frequency from the data signals. As shown in FIG. 6, the frequency spectra of the data signal $f_S$ and the control signal $f_C$ are contained within the bandwidth of $f_n$, where $f_n$ is $f_a$, $f_b$, $f_c$ or $f_d$. As shown in FIG. 7, the control signal and data signal bursts are sent sequentially so that the full power of the transmitter can be used for each. Alternatively, the control signals could use the same frequency as the data signals but be interleaved in time with the data signals, but this approach would require a more complex detection system to recognize the control bursts from the data bursts.

FIG. 8 shows the general form of the switch control system for controlling the energization of the desired input and output diode switches. In FIG. 8, the same reference numerals as used in FIG. 3 designate identical circuit elements; however, for the sake of simplicity, only a portion of the system shown in FIG. 3 is repeated in FIG. 8. It will nevertheless be understood that the basic control system shown in FIG. 8 would be duplicated in sufficient numbers to provide control for all desired combinations of input and output diode switches.

The control system includes a signal coupler 61 associated with the output of filter 351, for example, so that, in the example illustrated, a control signal received by antenna feed 31 within the bandwidth $f_a$ will be fed to the control filter 62. This filter passes the control signal spectrum within the bandwidth $f_a$ so that the data signals within that bandwith are effectively blocked and only the control signals are supplied to the demodulator 63. Since the control signal may be sent via FM, PSK or other means of modulation, a corresponding demodulator 63 is required. The output of the demodulator is supplied to a control logic 64 to put the demodulated signals into the proper form to operate the corresponding input and output diode switches. In the earlier example where a signal received by antenna feed 31 in the bandwidth $f_a$ is to be coupled to the transmitting antenna feed 52, the control logic 64 provides an output to energize the input diode switch 355 and an output to energize the output diode switch 452. This establishes a transponder signal path from the receiving antenna feed 31, the input amplifier 35, input filter 351, input diode switch 355, output amplifier 41, output filter 45 and output diode switch 452 to the transmitting antenna feed 52.

The input and output diode switches may be of any well known type, two examples of which are illustrated in FIGS. 9A and 9B. FIG. 9A shows a coaxial switch circuit 71 having a diode 72 connected in series with the center conductor. The capacitors 73, 74 and 75 and the chokes 76 and 77 form the bias circuit for the diode 72 to effectively isolate the direct current biasing or energizing voltage v which is applied at the junction between the capacitor 75 and choke 76 to forward bias the diode 72. FIG. 9B illustrates a conventional wave guide diode switch comprising a rectangular wave guide section 81 having a shunt connected diode 82. The capacitor 83 provides direct current isolation of the bias or energizing voltage v. In the case of the wave guide diode switch, conduction of the diode 82 effectively shortcircuits the wave guide section to block the passage of signal energy. A more detailed explanation of the operation of diode switches of the type illustrated in FIGS. 9A and 9B may be had with reference to the book by R. V. Garver, *Microwave Diode Control Devices*, published by Artech House, Inc. (1976), especially at pages 48, 68 and 69.

Figure 10:
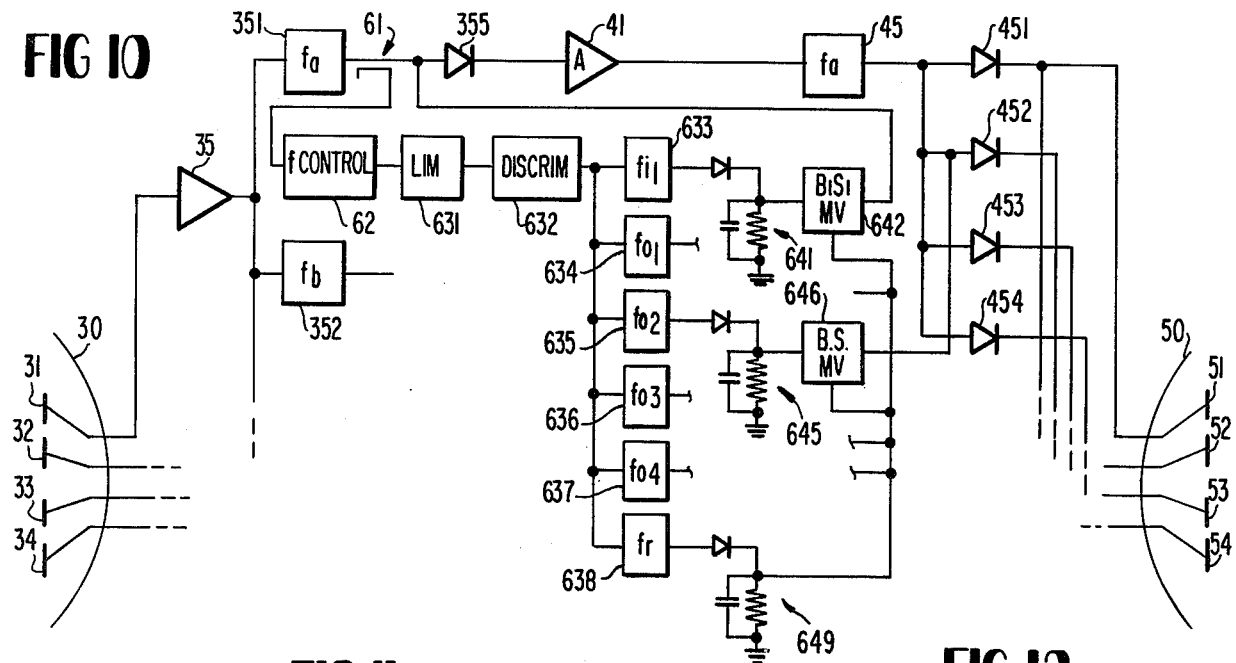
FIG. 10 is a block diagram of a specific switch control logic employing control tones.

The control system generally illustrated in FIG. 8 may be implemented in any of a number of different ways. FIG. 10 illustrates one specific implementation of the control system using various modulating frequencies to select the desired input and output switching operations, these frequencies being transmitted to the satellite by frequency modulating the control frequency $f_C$. Similar results can of course, be obtained by using phase shift keying or other modulating means to transmit the control signals. In the specific example illustrated in FIG. 10, the demodulator of FIG. 8 is actually made up of an FM limiter 631 and a discriminator 632. The control carrier frequency $f_C$ is frequency modulated by two different switch control frequencies simultaneously. One of these frequencies defines the area in which the transmitting earth station is located, and the other frequency defines the area to which the signal is to be sent. More specifically, one of these control frequencies, for example, $f_{i1}$, is used by all stations in area $A_1$ and all transponders. As will be understood with reference to FIG. 6, $f_{ix}$ is a fixed amount removed from the center frequency of each transponder. The absolute frequency differences between $f_{i1}$, $f_{i2}$, $f_{i3}$ etc. is equal to the channel separation. The function of this control frequency $f_{i1}$ is to enable the desired input diode switch, e.g., diode switch 355 in the example given. The control signal frequency $f_{i1}$ permits signals from only area $A_1$ to operate the control circuit for area $A_1$. Those signals from area $A_1$ picked up by the satellite receiver in antenna feed 32, for example, will not be passed by the input diode switch in its control circuit since that will operate only when modulated by a switch control frequency $f_{i2}$ used only by area $A_2$ stations.

This input switch control frequency $f_{i1}$ is derived after the control carrier frequency $f_C$ is limited by limiter 631 and detected by the frequency discriminator 632. The control signal frequency $f_{i1}$ is selected by the corresponding filter 633 and detected by the diode and RC circuit 641 which forms a part of the control logic 64. Since it is desired that the control signals from the earth station be sent for only a short duration prior to transmission of the data signals, it is necessary to provide some means to keep the desired input diode switch enabled for the duration of the data signal bursts. This is accomplished by the bistable multivibrator or flip-flop 642 which is set by the pulse output from the diode and RC circuit 641. The flip-flop 642 provides a continuous bias voltage signal to appropriately energize the diode input switch 355.

The control of the desired output diode switch is accomplished in a similar manner. More specifically, the desired output antenna beam is identified by one of the four control signal frequencies $f_{o1}$, $f_{o2}$, $f_{o3}$ or $f_{o4}$. These control signal frequencies are selected by one of the filters 634, 635, 636, or 637, respectively. The outputs of each of these filters are connected to respective diode and RC circuits which, in turn, provide a control pulse to a corresponding flip-flop. For example, the output of filter 635 is connected to the diode and RC circuit 645. A pulse generated by the diode and RC circuit 645 sets the flip-flop 646 which provides the control voltage to the output diode switch 452 feeding transmitting antenna feed 52.

Figure 11:
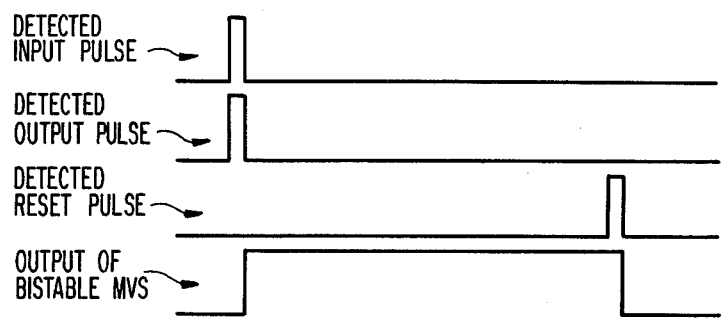
FIG. 11 is a timing diagram for the switch control logic shown in FIG. 10.
Figure 12:
FIG. 12 is a graphical illustration of the modulating frequency arrangement for the switch control logic shown in FIG. 10.

At the end of the data signal burst, a reset control signal frequency $f_r$ is transmitted. This reset control signal frequency is selected by the filter 638 and detected by the diode and RC circuit 649 to produce a pulse which resets the flip-flops 642 and 646. FIG. 11 shows the relative timing of the control signals, and FIG. 12 shows one possible frequency arrangement of the modulating control frequencies as used in the control system illustrated in FIG. 10. It will be understood that the modulating control frequency 1 is used to control input switching by all stations in area $A_1$, although the control carrier frequency $f_C$ differs for each transponder as shown in FIG. 6. The output switch modulating control frequencies are the same for all transponders as is the single reset frequency, but preferably differ from area to area.

Alternatively, the end of message reset control signal may be eliminated by recognizing that an earth station knows the number of voice or data channels which it plans to transmit during a given frame. This information as to the duration of its transmission is sent to the satellite following the transmission of its input and output control frequencies. The duration information is used to set a shift register for a delay equal to the expected transmission from that station for that frame. The pulse emerging from the output of the shift register can then be used to reset the input and output gates.

Figure 13:
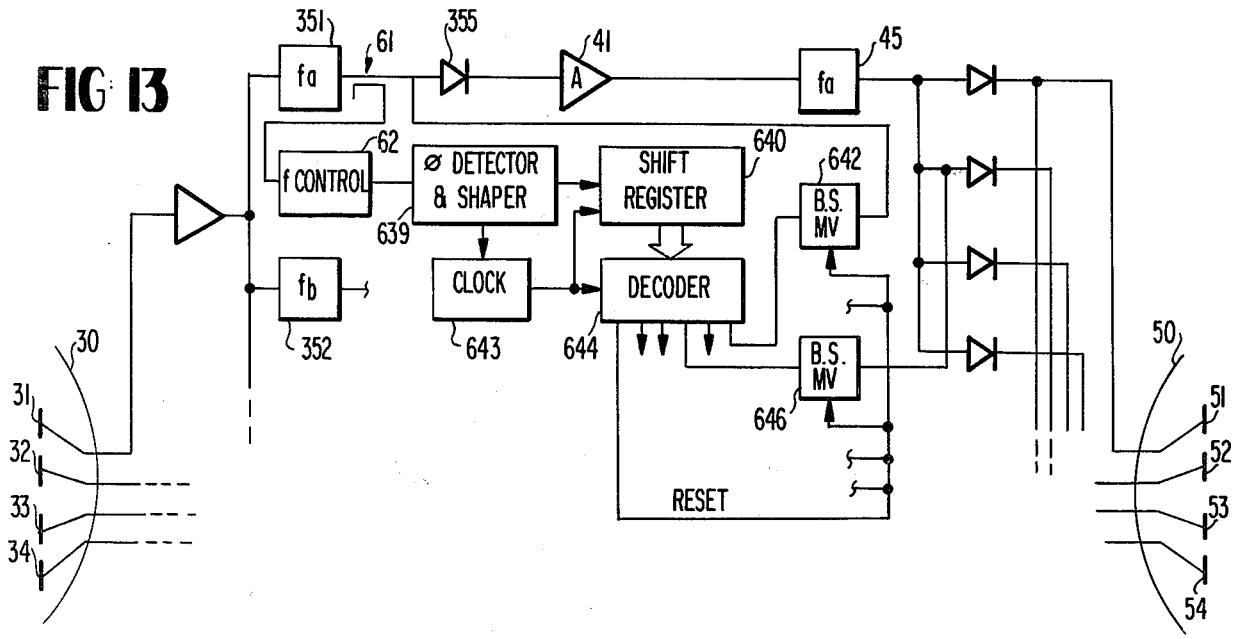
FIG. 13 is a block diagram of an alternative switch control logic which employs digital codes.

In the control system described with respect to FIG. 10, the control signals are transmitted by means of various control frequencies which frequency modulated a control carrier signal $f_c$, and these modulating frequencies are separated one from the other by suitable filters in the satellite. However, those skilled in the art will understand that other alternative arrangements are also possible for implementing the control system. For example, the control signals could be sent by combinations of digital pulses transmitted from the earth station by FM or PSK modulation. In this case, the control system may be implemented as illustrated in FIG. 13. Here, it is assumed that PSK modulation is used to transmit a digital code. The control signal frequency $f_C$ is selected by the filter 62 and supplied to the phase detector and shaper 639. The detector and shaper 639 provides a synchronizing pulse output to the clock 643 which generates clock pulses at the bit rate of the digital code. These clock pulses are used to shift the detected digital code into a shift register 640. The decoder 644 under the control of the clock 643 is responsive to the parallel output of the shift register 640 to provide a first output pulse to set the flip-flop 642 and a second output pulse to set the flip-flop 646. As before, these flip-flops 642 and 646 energize, respectively, input diode switch 355 and output diode switch 452 for the example given. The decoder also recognizes a digital code at the end of the data signal transmission to generate a reset pulse for the two flip-flops 642 and 646 which were set at the beginning of the data signal transmission.

While the invention has thus far been described in terms of only the specific system organization illustrated in FIG. 3, those skilled in the art will recognize that the principles of the invention may be applied to other and different system organizations. For example, in the system illustrated in FIG. 14, separate receiving antennas 11, 12, 13 and 14 are provided for each of the areas $A_1$, $A_2$, $A_3$ and $A_4$. These receiving antennas are connected to respective input amplifiers 35, 36, 37 and 38. As in the system shown in FIG. 3, each of these input amplifiers is followed by a set of four filters and four diode input switches. Corresponding filters in each set are connected to a corresponding one of the output amplifiers via respective input diode switches. It will be appreciated that the organization thus far described with respect to the system shown in FIG. 14 is substantially the same as the system shown in FIG. 3. However, in the FIG. 14 system, two transmitting antennas 91 and 92 are provided, and each of these transmitting antennas be pvoided with four vertically polarized feeds and four horizontally polarized feeds to provide four beams, each with two polarizations. The two polarizations and two transmitting antennas are used to provide a total of sixteen separate output ports, and amplifiers 41 and 42 or 43 and 44 can connect to each of the four transmitting antenna beams of antennas 91 or 92, respectively, via the output diode switches, separately or simultaneously, within interaction. Thus, the relative complexity of the output network of FIG. 3 may be simplified at the expense of supplying additional antennas and feeds.

Figure 15A:
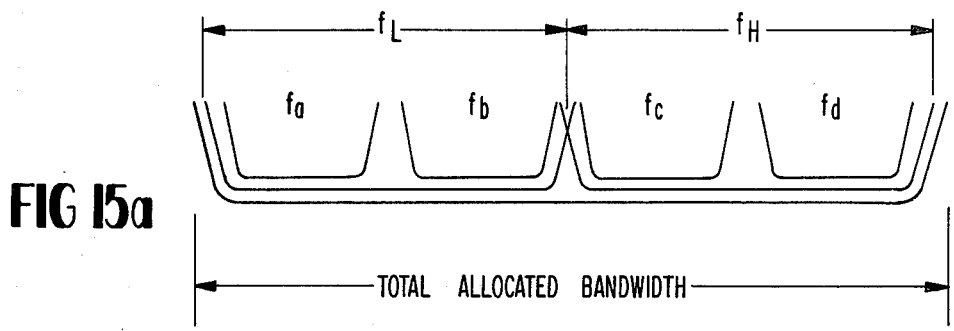
FIG. 15A is a graphical illustration showing the bandwidth allocation for system of FIG. 15.

Yet another variation is illustrated in FIG. 15. In this system, the number of up beams has been increased to eight, but the number of input and output amplifiers has been maintained at four each as in the preceding examples. This can be done if we are willing to restrict each station to half the possible bandwidth. A better understanding may be had with reference to FIG. 15a which shows the total allocated bandwidth divided in half as lower bandwidth $f_L$ and higher bandwidth $f_H$. Thus, in the system shown in FIG. 15, the eight up beam antennas are grouped into four pairs with one beam of each pair being restricted to the lower bandwidth while the other beam is restricted to the higher bandwidth. The right hand portion of FIG. 15 is similar to FIG. 14 in that separate down beam antennas are provided to eliminate the need for output filters.

Figure 16:
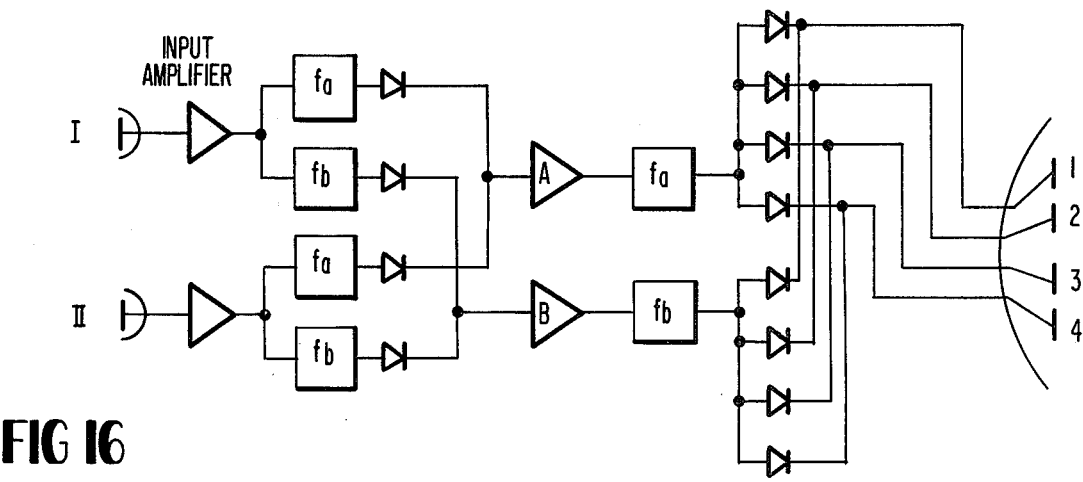
FIG. 16 and FIG. 17 are still other alternative satellite switching systems wherein the number of up beams is different from the number of down beams.
Figure 17:
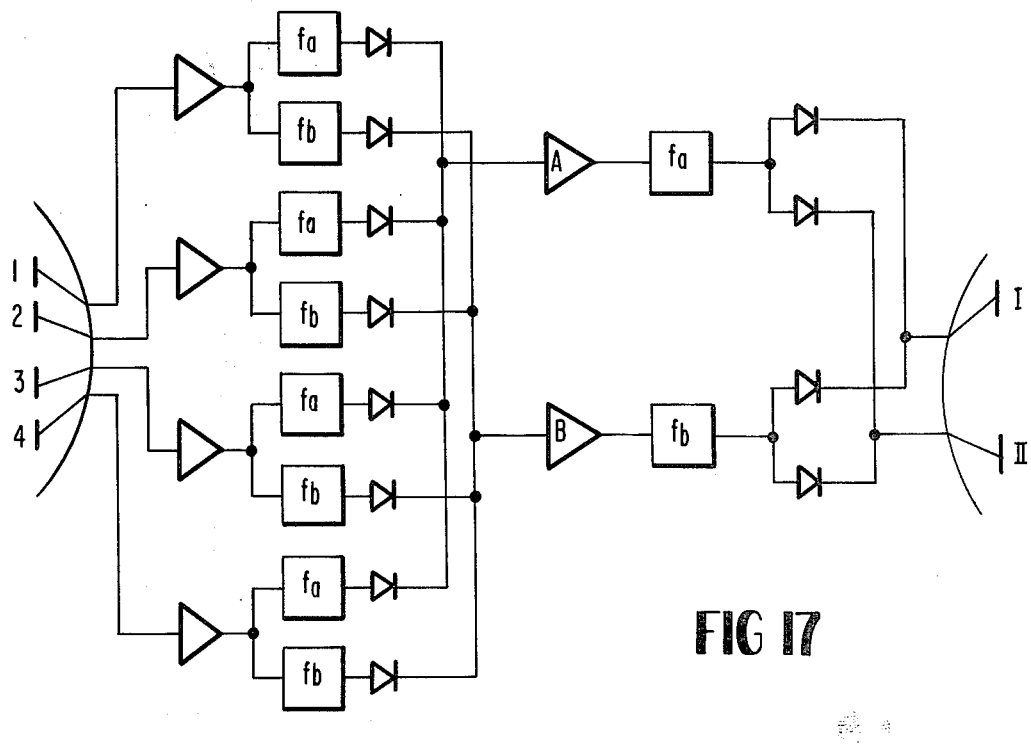

As those skilled in the art will recognize, the number of up beams does not have to be equal to the number of down beams in the practice of the invention. To illustrate this, FIG. 16 shows a system employing two up beams, two input and two output amplifiers and four down beams. FIG. 17 shows a system employing four up beams, four input and two output amplifiers, and two down beams. In order to understand how these systems might operate, reference is again made to FIG. 1. The antenna feeds with the arabic numerals 1, 2, 3 and 4 would illuminate the areas $A_1$, $A_2$, $A_3$ and $A_4$ as in the preceding examples. However, the antenna feeds with the roman numerals I and II would illuminate the areas $A_1 + A_2$ and $A_3 + A_4$, respectively. Obviously, both systems represent tradeoffs in terms of earth station antenna requirements, amplifier power and so forth. Nevertheless, these illustrations should suffice demonstrate the applicability of the invention to a number of different types of systems. Other modifications and variations will no doubt suggest themselves to those skilled in the art. For example, for a given number of antenna beams, more output amplifiers can be added, and these then become narrower in bandwidth and thus require less power per amplifier. Additional antennas are needed to provide feeds for these additional output amplifiers and still keep them isolated from the other amplifiers, however.

I claim:

1. A satellite system employing onboard switching comprising:
   receiving antenna means for providing a multiplicity of up path antenna beams directed toward different areas on the ground,
   a plurality of input amplifiers connected to said receiving antenna means for amplifying signals received in said multiplicity of up path antenna beams,
   a plurality of output amplifiers,
   input switch means for connecting the output of only one selected input amplifier to the input of an output amplifier,
   transmitting antenna means for providing a multiplicity of down path antenna beams directed toward different areas on the ground,
   output switch means for connecting the output of one or more selected output amplifiers to said transmitting antenna means to couple energy into one or more selected down path antenna beams, and
   switch control means for controlling said input switch means and said output switch means whereby a desired up path antenna beam is connected through a selected output amplifier to a desired down path antenna beam.

2. A satellite system according to claim 1 wherein said switch control means comprises:
   control signal detection means connected to said plurality of input amplifiers for detecting signals identifying desired up path and down path antenna beams, and
   control logic means responsive to said control signal detection means for selectively energizing said input and output switch means corresponding to said desired up path and down path antenna beams.

3. A satellite system according to claim 1 further comprising a plurality of identical sets of input filters, each set of input filters being connected to the output of a corresponding one of said plurality of input amplifiers and each set of input filters consisting of a number of contiguous bandpass filters equal in number to the number of said output amplifiers, corresponding filters in each set of input filters being selectively connected to the input of a common output amplifier by said input switch means.

4. A satellite system according to claim 3 wherein control signals are transmitted within the bandwidths of each of said contiguous bandpass filters and said switch control means comprises:
   control signal detection means connected to each of said contiguous bandpass filters in each set for detecting said control signals identifying desired up path and down path antenna beams, and
   control logic means responsive to said control signal detection means for selectively energizing said input and output switch means corresponding to said desired up path and down path antenna beams.

5. A satellite system according to claim 4 wherein said control signals are frequency modulated by a first frequency of a first plurality of frequencies equal in number to the number of up path antenna beams and a second frequency of a second plurality of frequencies equal in number to the number of down path antenna beams, each said control signal detection means comprising:
   a control frequency filter for passing the corresponding control signal transmitted within the bandwidth of the respective one of said contiguous bandpass filters,
   a frequency discriminator connected to said control frequency filters for detecting said first and second frequencies, and
   filter and detector means connected to said frequency discriminator for generating control pulses in response to said first and second frequencies.

6. A satellite system according to claim 5 wherein said control logic means comprises bistable multivibrator means set by said control pulses for providing switch control signals to said input and output switch means.

7. A satellite system according to claim 6 wherein said control signals are frequency modulated by a third frequency at the end of a data signal transmission and said filter and detector means is responsive to said third frequency to generate a reset pulse for said bistable multivibrator means.

8. A satellite system according to claim 4 wherein said control signals are pulse code modulated by a first code of a first plurality of codes equal in number to the number of up path antenna beams and a second code of a second plurality of codes equal in number to the number of down path antenna beams, each said control signal detection means comprising:
   a control frequency filter for passing the corresponding control signal transmitted within the bandwidth of the respective one of said contiguous bandpass filters, code detection means connected to said control frequency filter for detecting said first and second codes, and decoder means connected to said code detection means for generating control pulses in response to said first and second codes.

9. A satellite system according to claim 8 wherein said control logic means comprises bistable multivibrator means set by said control pulses for providing switch control signals to said input and output switch means.

10. A satellite system according to claim 9 wherein said control signals are pulse code modulated by a third code at the end of a data signal transmission and said code detection means is responsive to said third code to generate a reset pulse for said bistable multivibrator means.

11. A satellite system according to claim 4 wherein said control logic means comprises bistable multivibrator means for providing switch control signals to said input and output switch means, said bistable multivibrator means being set by control pulses generated by said control signal detection means.

12. A satellite system according to claim 11 wherein said control signals include a measure of time for the duration of the transmission, said control signal detection means including reset means for resetting said bistable multivibrator means, after the time for the duration of the transmission has elapsed.

13. A satellite system according to claim 3 wherein the number of output amplifiers is equal to the number of up path antenna beams.

14. A satellite system according to claim 3 wherein the number of output amplifiers is less than the number of up path antenna beams.

* * * * *